(12) United States Patent
Qiu et al.

(10) Patent No.: US 10,921,172 B2
(45) Date of Patent: Feb. 16, 2021

(54) METHOD AND SYSTEM FOR DETECTING VOLUMETRIC PARAMETERS OF LIQUID IN A CONTAINER

(71) Applicant: NORDSON CORPORATION, Westlake, OH (US)

(72) Inventors: Zhongquan Qiu, Shanghai (CN); Chenyu Yang, Shanghai (CN); Wen Jiang, Shanghai (CN)

(73) Assignee: Nordson Corporartion, Westlake, OH (US)

( * ) Notice: Subject to any disclaimer, the term of this patent is extended or adjusted under 35 U.S.C. 154(b) by 0 days.

(21) Appl. No.: 16/758,469

(22) PCT Filed: Oct. 30, 2018

(86) PCT No.: PCT/CN2018/112591
§ 371 (c)(1),
(2) Date: Apr. 23, 2020

(87) PCT Pub. No.: WO2019/085878
PCT Pub. Date: May 9, 2019

(65) Prior Publication Data
US 2020/0256717 A1  Aug. 13, 2020

(30) Foreign Application Priority Data

Oct. 30, 2018  (CN) .......................... 201711052058.0

(51) Int. Cl.
*B01F 3/04* (2006.01)
*G01F 23/18* (2006.01)
(Continued)

(52) U.S. Cl.
CPC .......... *G01F 23/18* (2013.01); *G01F 25/0061* (2013.01); *B05B 1/3013* (2013.01)

(58) Field of Classification Search
CPC .... G01F 23/18; G01F 25/0061; B05B 1/3013
See application file for complete search history.

(56) References Cited

U.S. PATENT DOCUMENTS 4,899,585 A    2/1990  Kulha
5,354,516 A *  10/1994  Tomita ................. G05D 7/0635
                                                        118/708
(Continued)

FOREIGN PATENT DOCUMENTS

CN        2117592 U      9/1992
CN        201897495 U    7/2011
(Continued)

*Primary Examiner* — Munear T Akki
(74) *Attorney, Agent, or Firm* — Baker & Hostetler LLP

(57) ABSTRACT

A method and detection system for determining volumetric parameters of liquid within a container using the diffusion of a reference amount of gas are described The method includes filling a first tube with gas to a reference pressure, allowing the gas to diffuse to the container, and measuring a first stable pressure of the gas. The container is then filled with an amount of the liquid and the first tube is filled with gas to the reference pressure. The supply of gas diffuses to the container and a second stable pressure of the gas is measured. Then, a portion of the amount of the liquid is discharged from the container and the first tube is filled with gas to the reference pressure. The supply of gas diffuses to the container, an instantaneous pressure of the supply of gas is detected, and an instantaneous volume of the liquid within the container is calculated.

20 Claims, 4 Drawing Sheets

(51) Int. Cl.
*G01F 25/00* (2006.01)
*B05B 1/30* (2006.01)

(56) References Cited

U.S. PATENT DOCUMENTS

| | | | | |
|---|---|---|---|---|
| 5,480,063 A | * | 1/1996 | Keyes | G01F 11/284 |
| | | | | 137/563 |
| 5,568,882 A | * | 10/1996 | Takacs | G01F 23/168 |
| | | | | 222/155 |
| 8,863,986 B2 | * | 10/2014 | Randall, Jr. | G01F 11/284 |
| | | | | 222/64 |
| 2006/0277992 A1 | * | 12/2006 | Calabrese | G01F 23/266 |
| | | | | 73/304 R |
| 2007/0163331 A1 | * | 7/2007 | Jarvie | G01M 3/3245 |
| | | | | 73/49.2 |
| 2007/0269882 A1 | * | 11/2007 | Zhang | G01N 35/1095 |
| | | | | 435/287.1 |
| 2012/0228325 A1 | * | 9/2012 | Randall, Jr. | G01F 11/284 |
| | | | | 222/1 |
| 2014/0130576 A1 | * | 5/2014 | Blendinger | B05B 1/002 |
| | | | | 73/37 |
| 2018/0264491 A1 | * | 9/2018 | Goldowsky | B05B 7/2489 |
| 2020/0066552 A1 | * | 2/2020 | Susa | C23C 16/4481 |

FOREIGN PATENT DOCUMENTS

| | | |
|---|---|---|
| CN | 105424141 A | 3/2016 |
| JP | 2000-275084 A | 10/2000 |

* cited by examiner

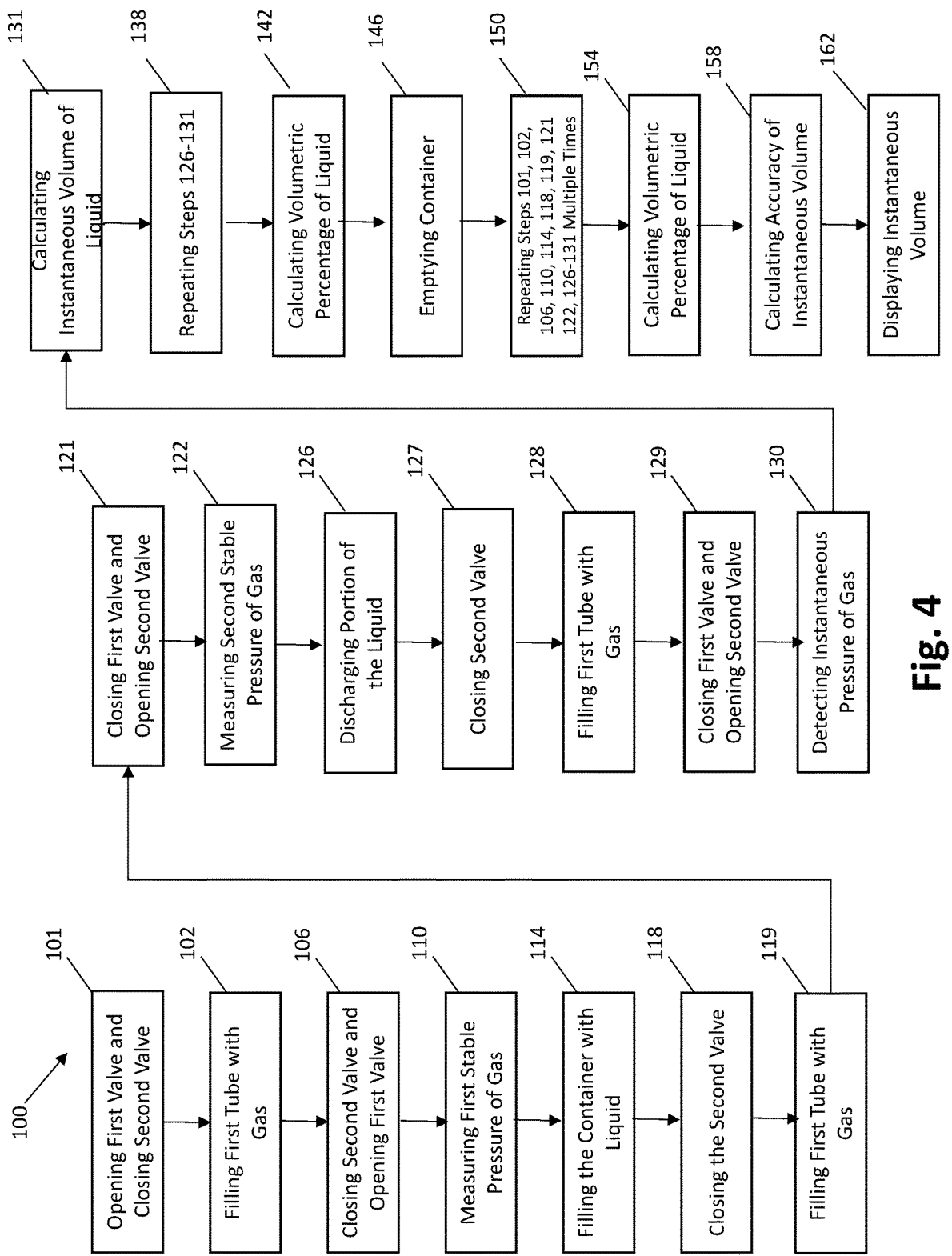

METHOD AND SYSTEM FOR DETECTING VOLUMETRIC PARAMETERS OF LIQUID IN A CONTAINER

CROSS REFERENCE TO RELATED APPLICATIONS

This application is a National Stage Application of International Patent App. No. PCT/CN2018/112591, filed Oct. 30, 2018, which claims priority to Chinese Application No. 201711052058.0, filed Oct. 30, 2017, the entire disclosures of both of which are hereby incorporated by reference as if set forth in their entirety herein.

TECHNICAL FIELD

The present application relates to a method and detection system for determining a volumetric parameter of a liquid in a container.

BACKGROUND

In the field of liquid spraying and coating, smaller sealed containers for storing liquid can be used that are capable of being refilled as needed during a dispensing operation. As such, it is useful for an operator to know how much liquid remains in a container at any given time. Some methods for determining an internal liquid level in a sealed container are well known. For example, methods are known for measuring weight variations of a container, measuring liquid throughput of the container, measuring pressurization and gas discharge duration, etc.

However, known methods for determining an internal liquid level in sealed containers have many defects. For example, the cost to implement such methods can be high due to the requirement for a high level of sensor precision. Additionally, known detection methods can have instability due to the system's structure and external interference, inconvenience due to assembly requirements, and long detections times. Also, often such containers may not be not easily opened or weighed. In operations in which the material within the container is heated, detection of real-time material level can be subject to many further restrictions that previous methods of liquid detection cannot comply with.

Therefore, there is a need for a method and system for detecting an internal liquid level in a sealed container that is reliable, quick, and does not require container disassembly.

SUMMARY

An embodiment of the present disclosure includes a method for determining volumetric parameters of liquid within a container. The method includes a) closing a second valve and opening a first valve connected to the second valve by a first tube, b) filling the first tube with gas through the first valve until a supply of gas within the first tube reaches a reference pressure, and c) closing the first valve and opening the second valve, such that the supply of gas diffuses to the container through a second tube attached to the second valve and the container, wherein the container contains none of the liquid. The method also includes d) measuring a first stable pressure of the supply of gas, e) filling the container with an amount of the liquid, f) closing the second valve, and g) filling the first tube with gas through the first valve until the supply of gas within the first tube reaches the reference pressure. Also, the method includes h) closing the first valve and opening the second valve, such that the supply of gas diffuses to the container through the second tube, i) measuring a second stable pressure of the supply of gas, j) discharging a portion of the amount of the liquid from the container, and k) closing the second valve. Additionally, the method includes l) filling the first tube with gas through the first valve until the supply of gas within the first tube reaches the reference pressure, m) closing the first valve and opening the second valve, such that the supply of gas diffuses to the container through the second tube, n) detecting an instantaneous pressure of the supply of gas, and o) calculating an instantaneous volume of the liquid within the container.

Another embodiment of the present disclosure is a detection system for determining a volumetric parameter of a liquid in a container. The detection system includes a first valve, a second valve, and a first tube connected to the first valve and the second valve, where the first tube is configured to receive a supply of gas at a reference pressure when the first valve is open and the second valve is closed. The detection system also includes a second tube connected to the second valve and the container, a pressure sensor in fluid communication with the first and second tubes, and a controller in signal communication with the first and second valves and the pressure sensor, wherein the controller is configured to selectively open and close the first and second valves. The controller is configured to receive a first signal from the pressure sensor corresponding to a first stable pressure of the supply of gas when the first valve is closed and the second valve is open, such that the supply of gas diffuses through the first and second tubes and the container, and the container contains none of the liquid, as well as receive a second signal from the pressure sensor corresponding to a second stable pressure of the supply of gas when the first valve is closed and the second valve is open, such that the supply of gas diffuses through the first and second tubes and the container, and the container contains an amount of the liquid. The controller is also configured to receive a third signal from the pressure sensor corresponding to an instantaneous pressure of the supply of gas when the first valve is closed and the second valve is open, such that the supply of gas diffuses through the first and second tubes and the container, and the container contains a portion of the amount of the liquid. The controller is also configured to calculate an instantaneous volume of the portion of the amount of the liquid.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

FIG. 4 is a process flow diagram of a method of determining volumetric parameters of liquid within the container according to an embodiment of the present disclosure.

DETAILED DESCRIPTION OF ILLUSTRATIVE EMBODIMENTS

Figure 1:
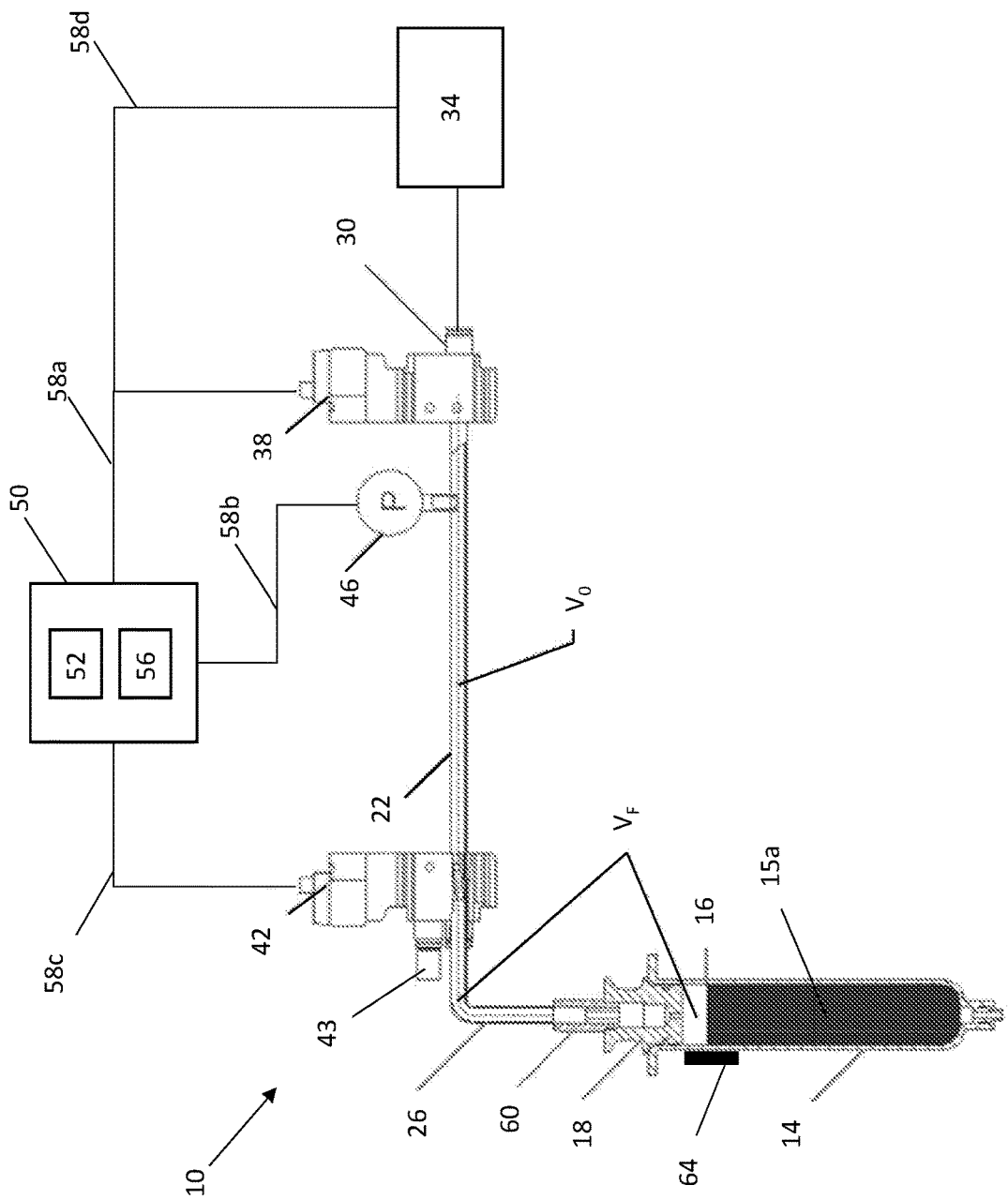
FIG. 1 is a schematic view of a detection system for detecting volumetric parameters of a liquid in a container according to an embodiment of the present invention, where the container is fully filled with the liquid.

Described herein is a detection system 10 for detecting volumetric parameters of liquid in a container 14 using the diffusion of a reference amount of gas. Certain terminology is used to describe the detection system 10 in the following description for convenience only and is not limiting. The words "right," "left," "lower," and "upper" designate directions in the drawings to which reference is made. The words "upper" and "lower" refer to directions along the detection system 10 and related parts thereof. The words "inner" and "outer" refer to directions toward and away from, respectively, the geometric center of the description to describe the detection system 10 and related parts thereof. The terminology includes the above-listed words, derivatives thereof, and words of similar import.

The detection system 10 may be connected to a container 14 that is configured to receive a liquid, and can be utilized to determine a volumetric parameter of the liquid in the container 14. The container 14 may be, for example, an adhesive container, an adhesive barrel, an adhesive box, a test tube, a water storage pool, an oil reservoir, or the like. However, the container 14 is not limited to the above listed examples. The container 14 can be a container which is not easily opened or weighed, and in which the volume percent, volume magnitude, or liquid level of the liquid needs to be determined. In operation, the container 14 can be mounted onto a base or a bracket of a supporting structure (not shown).

Figure 2:
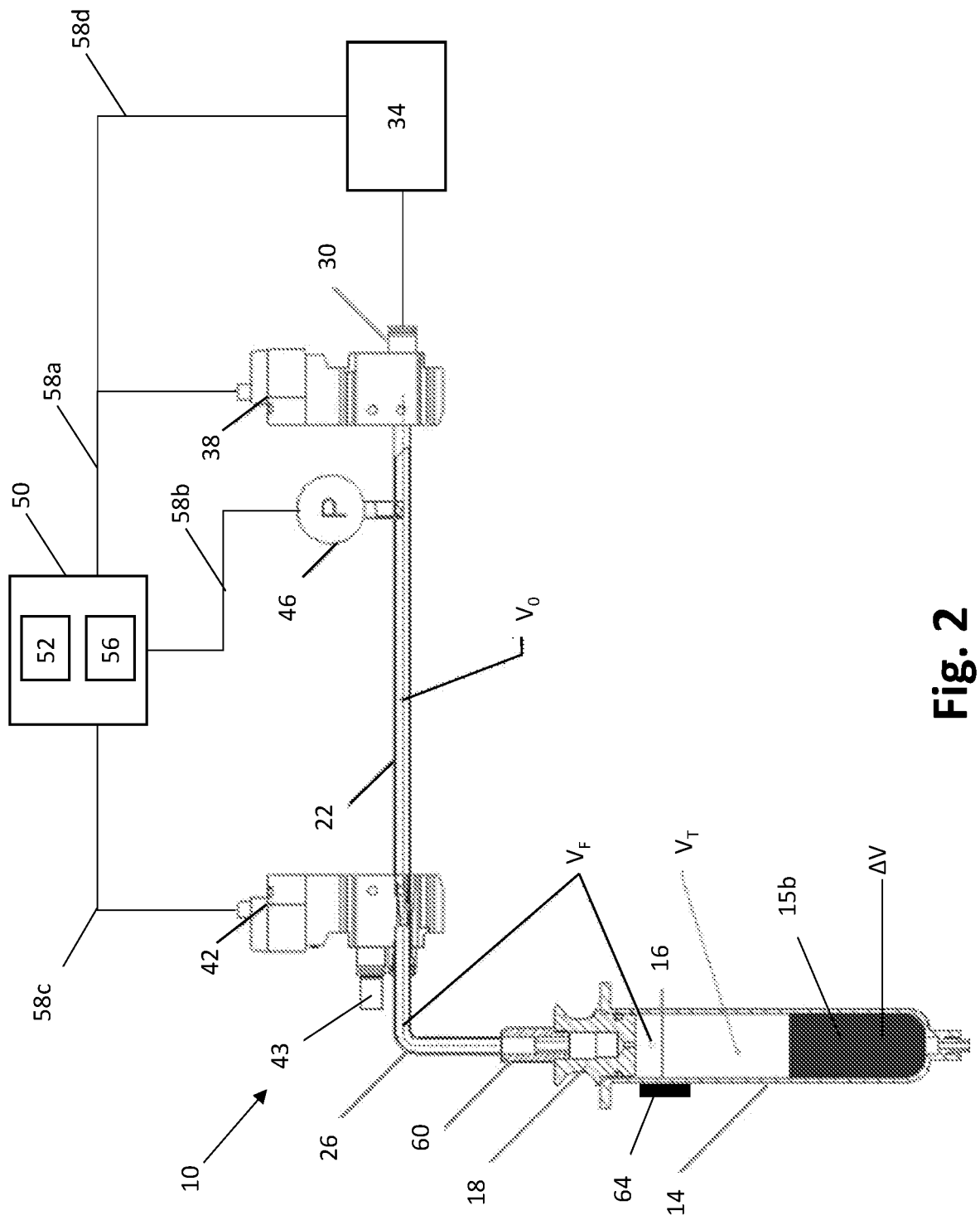
FIG. 2 is a schematic the detection system shown in FIG. 1, where the container is partially filled with the liquid.
Figure 3:
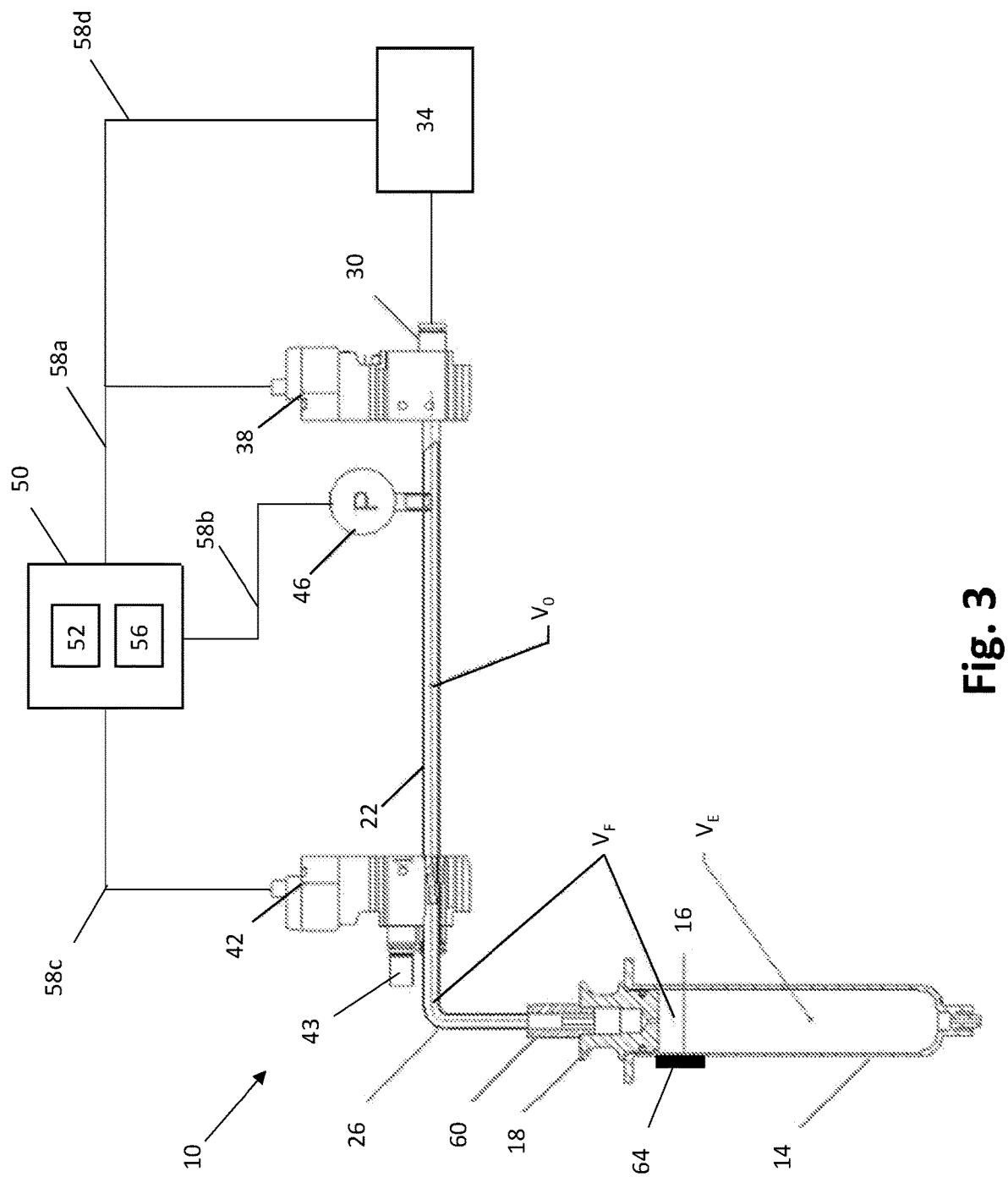
FIG. 3 is a schematic view of the detection system shown in FIG. 1, where the container is filled with no liquid.

Referring to FIGS. 1-3, the detection system 10 is shown connected to a container 14 that is fully filled with a full supply of liquid 15a. As illustrated in FIG. 1, the detection system includes an adapter 18 configured to be connected to the container 14. The adapter 18 may be secured to the container 14 through an interference fit, threaded engagement, snap fit, etc. The adapter 18 can be configured to allow the detection system 10 to connect to a variety of shapes, sizes, or designs of containers 14, though it is contemplated that the detection system 10 can include a variety of different adapters to achieve this purpose. As such, though one embodiment of an adapter 18 is shown, other types and designs of adapters are contemplated.

The detection system 10 can further include a second tube 26 that is connected to the adapter 18, and thus is in communication with an interior of the container 14. The second tube 26 can comprise a flexible or rigid tubing member, and can be comprised of metal, plastic, rubber, etc. A reinforcement member 60 can be disposed between the adapter 18 and the second tube 26, where the reinforcement member 60 is configured to create a fluidic seal between the adapter 18 and the second tube 26 and thus prevent gas from leaking out of the detection system 10. The detection system 10 can further include a second valve 42 connected to the second tube 26 at the end opposite the adapter 18, where the second valve 42 can also be referred to as a diffusion valve. As depicted, the second valve 42 is a three-way solenoid valve having an input connected to a first tube 22, an output connected to the second tube 26, and an exhaust 43 configured to exhaust air from the first or second tubes 22, 26 to the atmosphere. However, in other embodiments the second valve 42 can be any type of conventional valve that is capable of selectively allowing and stopping gas flow therethrough, and can be controlled automatically and/or manually, as will be discussed further below. Though the exhaust 43 is depicted as located on one side of the second valve 42, other embodiments of the second valve 42 can comprise the exhaust 43 being located elsewhere. A first tube 22 can be connected to the second valve 42 opposite the second tube 26, and can extend from the second valve 42 to a first valve 38, which can also be referred to as the gas intake valve. Like the second tube 26, the first tube 22 can comprise a flexible or rigid tubing member, and can be comprised of metal, plastic, rubber, etc. Further, like the second valve 42, the first valve 38 can be any type of conventional valve that is capable of selectively allowing and stopping gas flow therethrough, and can be controlled automatically and/or manually, as will be discussed further below. The first valve 38 can also be connected to a pressurized gas source 34 via a third tube 30. Like the first and second tubes 22, 26, the third tube 30 can comprise a flexible or rigid tubing member, and can be comprised of metal, plastic, rubber, etc. The pressurized gas source 34 can comprise any conventional air pump capable of selectively supplying pressurized air to the detection system 10.

The detection system 10 can also include a pressure sensor 46 that is in fluid communication with the first and second tubes 22, 26. In the depicted embodiment, the pressure sensor 46 is connected to the first tube 22 between the first valve 38 and the second valve 42. However, other connection locations are contemplated. The pressure sensor 46 can be any conventional type of pressure sensor that is capable of measuring the pressure of gas within an enclosed space. Though the detection system 10 is shown as including one pressure sensor 46, in other embodiments the detection system 10 can include multiple pressure sensors connected to aspects of the detection system 10 at varied locations.

Continuing with FIGS. 1-3, the detection system 10 can include a controller 50 configured to control aspects of the detection system 10. The controller 50 can comprise any suitable computing device configured to host a software application for monitoring and controlling various operations of the detection system 10 as described herein. It will be understood that the controller 50 can include any appropriate computing device, examples of which include a processor, a desktop computing device, a server computing device, or a portable computing device, such as a laptop, tablet, or smart phone. Specifically, the controller 50 can include a memory 52 and a human-machine interface (HMI) device 56. The memory 52 can be volatile (such as some types of RAM), non-volatile (such as ROM, flash memory, etc.), or a combination thereof. The controller 50 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 50. The HMI device 56 can include inputs that provide the ability to control the controller 50, via, for example, buttons, soft keys, a mouse, voice actuated controls, a touch screen, movement of the controller 50, visual cues (e.g., moving a hand in front of a camera on the controller 50), or the like. The HMI device 56 can comprise a display (such as an LED, LCD, or plasma screen) configured to display pressure readings communicated to the controller 50 by the pressure sensor 46, as well as volumetric parameters determined by the controller 50 based upon pressure readings, as will be described further below. In various configurations, the HMI device 56 can include a display, a touch screen, a keyboard, a mouse, a motion detector, a speaker, a microphone, a camera, or any combination thereof. The HMI device 56 can further include any suitable device for inputting biometric information, such as, for example, fingerprint information, retinal information, voice information, and/or facial characteristic information, for instance, so as to require specific biometric information for accessing the controller 50.

As stated previously, the controller 50 can be in signal communication with various components of the detection system 10. For example, the controller 50 can be in signal communication with the first valve 38 through a first signal connection 58a, the controller 50 can be in signal communication with the pressure sensor 46 through a second signal connection 58b, the controller 50 can be in signal communication with the second valve 42 through a third signal connection 58c, and the controller 50 can be in signal communication with the pressurized gas source 34 through a fourth signal connection 58d. Each of the signal connections 58a-58d can be wired and/or wireless connections. For example, the wireless connections can consist of ZigBee, Z-wave, Bluetooth, Wi-Fi, or radio wave connections. Through the signal connections 58a, 58c, the controller 50 can selectively open and close the first and second valves 38, 42, as will be described further below. The controller 50 can receive periodic or constant signals through second signal connection 58b from the pressure sensor 46 that are representative of the pressure of the gas within the first and second tubes 22, 26. Through the fourth signal connection 58d, the controller 50 can direct operation of the pressurized gas source 34, and thus the supply of gas to the first and second tubes 22, 26.

The container 14 can have a liquid level upper limit marker 16 to represent a maximum allowed liquid level in the container 14. The liquid level upper limit marker 16 may be a scale, a protrusion, a recess or the like structure that may be easily observed. Accordingly, the container 14 may be comprised of a substantially translucent material. An alarming device may 64 can be attached to the container 14, where the alarming device 64 can produce an alert when the liquid level within the container 14 is higher than the liquid level upper limit marker 16. When the liquid in the container reaches the liquid level upper limit marker 16, it indicates that the container 14 is fully filled with the liquid. The alarming device 64 can be a capacitance level sensor, an optical level sensor, or any other conventional type of level sensor. It may be easily understood that in replacement of the liquid level upper limit marker 16, a volume or weight of the liquid filled into the container 14 may be measured. When the volume or weight of the liquid reaches a predetermined threshold, it indicates that the container 14 is fully filled with the liquid.

During a dispensing operation where liquid is being dispensed from the container 14, the level of liquid within the container 14 will inevitably decrease. As shown in FIG. 1, initially the container 14 can be filled to a maximum level (as indicated by the liquid level upper limit marker 16) such that a full supply of liquid 15a is contained within the container 14. Then, once dispensing begins, liquid will begin to leave the container 14. At this stage, the container 14 will contain a partial supply of liquid 15b (as shown in FIG. 2). Though the partial supply of liquid 15b is shown as a specific liquid level, the partial supply of liquid 15b can be anywhere between the full supply of liquid 15a and no liquid. After a period of time, the supply of liquid within the container 14 will be completely depleted, as shown in FIG. 3. The detection system 10 can help keep an operator apprised of the liquid level within the container 14 throughout each of these stages.

In operation, gas from the pressurized gas source 34 may be directed to the interior of the container 14 through the first valve 38, the first tube 22, the second valve 42, the second tube 26, and the adapter 18. The first and second valves 38, 42 can be selectively closed and opened to create unique volumetric regions within the detection system 10. Within the context of the present disclosure, opening the first valve 38 specifically refers to unblocking the fluidic connection between the first tube 22 and the third tube 30, while closing the first valve 38 refers to blocking the fluidic connection between the first tube 22 and the third tube 30. Similarly, within the context of the present disclosure, opening the second valve 42 specifically refers to unblocking the fluidic connection between the first tube 22 and the second tube 26, while closing the second valve 42 refers to blocking the fluidic connection between the first tube 22 and the second tube 26. When the first and second valves 38, 42 are both closed, a volume of a space is formed by the first valve 38, the first tube 22, and the second valve 42. This volume can be referred to as a reference volume $V_0$. When the first valve 38 is closed and the container 14 is fully filled with the liquid, that is, the container 14 contains the full supply of liquid 15a and the liquid in the container 14 reaches the liquid level upper limit marker 16, a volume of a space can be formed by the second valve 42, the second tube 26, the adapter 18, and the portion of the container 14 that does not contain liquid. This volume is referred to as the full volume $V_F$ in a full-volume liquid state. When the second valve 42 is opened and the first valve 38 is closed, a total volume that is not occupied by the liquid acquired in the detection system 10 equals the reference volume $V_0$ added to the full volume $V_F (V_0+V_F)$.

As stated above, FIG. 2 illustrates the detection system 10 connected to a container 14 that is partially filled with the liquid. The partial supply of liquid 15b (having an instantaneous volume $\Delta V$) is greater than zero and less than the full supply of liquid 15a. When compared with FIG. 1, where the container 14 contains the full supply of liquid 15a, in FIG. 2 the container 14 defines an additional volume that does not contain liquid. The additional volume is equal to a difference between the volume of the space formed by the second valve 42, the second tube 26, the adapter 18 and the container 14 when the container 14 holds the partial supply of liquid 15b, and the capture volume $V_F$ defined when the container holds the full supply of liquid 15a. The additional volume is also referred to as an instantaneous volume $V_T$. In this case, when the first valve 38 is closed and the second valve 42 is open, a total volume that is not occupied by the liquid within the detection system 10 and the container 14 according to the present invention is represented by the phrase $V_0+V_F+V_T$, and thus comprises the reference volume $V_0$, the full volume $V_F$, and the instantaneous volume $V_T$.

FIG. 3 illustrates the system in FIG. 1, but where the container 14 is filled with no liquid. In this case, as compared with the scenario where the container 14 is fully filled with the liquid, an additional volume is acquired when the container 14 is filled with no liquid. The additional volume is equal to a difference between the volume of the space formed by the second valve 42, the second tube 26, the adapter 18, and the container 14 when the container 14 is filled with no liquid, and the full volume $V_F$ defined when the container 14 holds the full supply of liquid 15a. This additional volume can be referred to as an empty volume $V_E$. In practice, the empty volume $V_E$ within the container 14 is equal to a total volume of the liquid when the container 14 is filled with a maximum volume of liquid (i.e., the full supply of liquid 15a). In this case, when the first valve 38 is closed and the second valve 42 is open, a total volume that is not occupied by the liquid in the detection system 10 and the container 14 is represented by the phrase $V_0+V_F+V_E$.

In operation, when determining a volumetric parameter of the liquid that remains in the container 14, the detection system 10 utilizes Boyle's Law. According to Boyle's Law, the volume of a specific amount of gas varies inversely with the pressure of the gas. Boyle's Law may be represented by Equation 1:

$$PV=C \qquad \text{Equation 1}$$

where:
P=gas pressure;
V=gas volume; and
C=gas-specific constant.

According to Equation 1, the pressure of the gas varies inversely proportional to the volume of the gas at any instant. As a first step, when the detection system 10 is connected to the container 14, the controller 50 can be configured to open the first valve 38, close the second valve 42, and direct the pressurized gas source 34 to pump pressurized air into the first tube 22. Closing the second valve 42 can also involve exhausting air within the second tube 26 and container 14 through the exhaust 43, such that the air contained within the second tube 26 and container 14 reaches atmospheric pressure. Once a supply of gas within the first tube reaches a reference pressure $P_0$, the first valve 38 can be closed. In one embodiment, the reference pressure $P_0$ can be predetermined as 3.5 bar. However, other reference pressures are contemplated. In this state, the supply of gas has the reference pressure $P_0$ when contained within the reference volume $V_0$. Then, the second valve 42 can be opened, and the gas sealed between the first and second valves 38, 42 may be diffused to a space defined by the second tube 26 and the portion of the container 14 not occupied by liquid. As the supply of gas diffuses, its pressure will decrease while the volume it occupies increases. Therefore, Equation 1 can be utilized to derive Equation 2, which interrelates the reference pressure and volume $P_0$, $V_0$, to the pressure and volume of the supply of gas when the container 14 is fully filled with the liquid, that is, contains the full supply of liquid 15a, the pressure and volume of the supply of gas when the container 14 is partially filled with the liquid, that is, contains the partial supply of liquid 15b, and the pressure and volume of the supply of gas when the container 14 is filled with no liquid. Equation 2 states:

$$P_0 \cdot V_0 = P_F \cdot (V_0 + + V_F) = P_E \cdot (V_0 + V_F + V_E) = P_T \cdot (V_0 + V_F + V_T) = C \qquad \text{Equation 2}$$

where:
$P_0$=reference pressure;
$V_0$=reference volume;
$P_F$=full volume pressure (pressure of supply of gas when occupying the full volume);
$V_F$=full volume;
$P_E$=empty pressure (pressure of supply of gas when occupying the empty volume);
$V_E$=empty volume;
$P_T$=instantaneous pressure (pressure of supply of gas when occupying the instantaneous volume);
$V_T$=instantaneous volume; and
C=gas-specific constant.

In the above expression, all the pressures may be measured by the pressure sensor 46 and communicated to the controller 50 via the second signal connection 58b. Therefore, the instantaneous volume of the supply of gas in any state in the system may be explicitly expressed as a function of the measured pressure of the supply of gas.

Based on Equation 2, Equation 3 can be derived, and from Equation 3, Equations 4, 5, and 6, where the variables used are identical to those present in Equation 2:

$$V_0 + V_F = \frac{P_0 \cdot V_0}{P_F} \qquad \text{Equation 3}$$

$$V_0 + V_F + V_E = \frac{P_0 \cdot V_0}{P_E} \qquad \text{Equation 4}$$

$$V_E = \frac{P_0 \cdot V_0}{P_E} - \frac{P_0 \cdot V_0}{P_F} \qquad \text{Equation 5}$$

$$V_T = \frac{P_0 \cdot V_0}{P_T} - \frac{P_0 \cdot V_0}{P_F} \qquad \text{Equation 6}$$

Utilizing Equations 5 and 6, an instantaneous volume $\Delta V$ of liquid within the container 14 can be calculated, as stated in Equation 7.

$$\Delta V = V_E - V_T = \frac{P_0 \cdot V_0}{P_E} - \frac{P_0 \cdot V_0}{P_T} = P_0 \cdot V_0 \left( \frac{1}{P_E} - \frac{1}{P_T} \right) \qquad \text{Equation 7}$$

In practice, an operator must undergo various steps in order to obtain the variables utilized in Equations 2-7 that allow the calculation of the instantaneous volume of the liquid in Equation 7. After connecting the detection system 10 to the container 14, the controller 50 can direct the second valve 42 to close, the first valve 38 to open, and the pressurized gas source 34 to provide a supply of gas to the first tube 22. Closing the second valve 42 can also involve exhausting air within the second tube 26 and container 14 through the exhaust 43, such that the air contained within the second tube 26 and container 14 reaches atmospheric pressure. The pressurized gas source 34 can continue to provide gas to the first tube 22 until the pressure sensor 46 indicates to the controller 50 that a predetermined reference pressure $P_0$ has been reached. As stated above, one example of the reference pressure $P_0$ is 3.5 bar, though other reference pressures are contemplated. Once this occurs, the controller 50 can direct the pressurized gas source 34 to discontinue supplying gas to the first tube 22 and close the first valve 38. At this time, the supply of gas will have the reference pressure $P_0$ and fill the reference volume $V_0$.

After this occurs, the controller 50 can direct the second valve 42 to open while keeping the first valve 38 closed. Once this occurs, the supply of gas will diffuse through the second valve 42, the second tube 26, the adapter 18, and the empty container 14. At this time, the supply of gas will occupy the empty volume $V_E$ and the full volume $V_F$ in addition to the reference volume $V_0$. Once the supply of gas stabilizes, the controller 50 can receive a first signal from the pressure sensor 46 through the second signal connection 58b that corresponds to the empty pressure $P_E$ of the supply of gas when the supply of gas occupies the empty volume $V_E$, the full volume $V_F$, and the reference volume $V_0$. Following this, both the first and second valves 38, 42 can be opened and the container 14 can be filled to the liquid level upper limit marker 16 with the full supply of liquid 15a.

Then, the controller 50 can direct the second valve 42 to close, and the pressurized gas source 34 to again provide a supply of gas to the first tube 22. Closing the second valve 42 can also involve exhausting air within the second tube 26 and container 14 through the exhaust 43, such that the air contained within the second tube 26 and container 14 reaches atmospheric pressure. The pressurized gas source 34 can continue to provide gas to the first tube 22 until the pressure sensor 46 indicates to the controller 50 that the predetermined reference pressure $P_0$ has been reached. Once this occurs, the controller 50 can direct the pressurized gas source 34 to discontinue supplying gas to the first tube 22 and the first valve 38 to close. At this time, the supply of gas will have the reference pressure $P_0$ and fill the reference volume $V_0$. Then, the controller 50 can direct the second valve 42 to open while keeping the first valve 38 closed. Once this occurs, the supply of gas will diffuse through the second valve 42, the second tube 26, the adapter 18, and the portion of the container 14 that does not hold liquid. As such, the supply of gas will occupy just the full volume $V_F$ and the reference volume $V_0$. Once the supply of gas stabilizes, the controller 50 can receive a second signal from the pressure sensor 46 that corresponds to the full pressure $P_F$ of the supply of gas when the supply of gas occupies the full volume $V_F$ and the reference volume $V_0$. During this, the first valve 38 remains closed while the second valve 42 remains open.

Next, the controller 50 can direct the first and second valves 38, 42 to open and a dispensing operation to commence. In one embodiment, the pressurized gas source 34 provides pressurized air to the container 14 to pump the liquid from the container 14, though other means of dispensing are contemplated. During the course of a dispensing operation, the level of liquid within the container 14 will decrease from the full supply of liquid 15*a* to the partial supply of liquid 15*b*, which, as previously stated, can be anywhere from no liquid to the full supply of liquid 15*a*.

To continue the measuring operation, the controller 50 can direct the second valve 42 to close, and the pressurized gas source 34 to again provide a supply of gas to the first tube 22. Closing the second valve 42 can also involve exhausting air within the second tube 26 and container 14 through the exhaust 43, such that the air contained within the second tube 26 and container 14 reaches atmospheric pressure. The pressurized gas source 34 can continue to provide gas to the first tube 22 until the pressure sensor 46 indicates to the controller 50 that the predetermined reference pressure $P_0$ has been reached. Once this occurs, the controller 50 can direct the pressurized gas source 34 to discontinue supplying gas to the first tube 22 and the first valve 38 to close. At this time, the supply of gas will have the reference pressure $P_0$ and fill the reference volume $V_0$. Then, the controller 50 can direct the second valve 42 to open while keeping the first valve 38 closed. Once this occurs, the supply of gas will be diffused throughout the first tube 22, the second valve 42, the second tube 26, the adapter 18, and the portion of the container 14 that does not hold the partial supply of liquid 15*b*. As such, the supply of gas will occupy the reference volume $V_0$, the full volume $V_F$, and the instantaneous volume $V_T$. Once the supply of gas stabilizes, the controller 50 can receive a third signal from the pressure sensor 46 through the second signal connection 58*b* that corresponds to the instantaneous pressure $P_T$ of the supply of gas when the supply of gas occupies the reference volume $V_0$, full volume $V_F$, and instantaneous volume $V_T$. Upon receiving these signals, the controller 50 can calculate the instantaneous volume $\Delta V$ of liquid within the container 14 at any particular time. Particularly, this calculation can be performed according to Equation 7 as described above.

Determining the instantaneous volume $\Delta V$ of liquid within the container 14 at any particular time is only one volumetric parameter that the detection system 10 can determine. In addition to the instantaneous volume $\Delta V$, the detection system can also determine the volumetric percentage V % of the remaining liquid in the container. The controller may perform this calculation by dividing Equation 7 by Equation 5, which yields Equation 8, as shown below, where the variables used are identical to those presented above:

$$V\% = \frac{P_E \cdot P_F}{P_F - P_E} \cdot \left(\frac{1}{P_E} - \frac{1}{P_T}\right) \qquad \text{Equation 8}$$

As known from the above expression, the volumetric percentage V % of the remaining liquid in the container 14 is correlated to three pressure values $P_F$, $P_E$ and $P_T$, and with respect to a specific detection system and a specific amount of initial gas, pressure values $P_F$ and $P_E$ are constants. Accordingly, through the above theoretical deviation, the volumetric percentage V % of the remaining liquid in the container may be obtained. Where the cross-sectional area of the container 14 is constant, the volumetric percentage V % will be equal to the liquid level percent of the remaining liquid in the container 14.

In addition to the volumetric percentage V % and the instantaneous volume $\Delta V$ of liquid within the container 14, the controller 50 can also calculate the accuracy $\delta$ of the instantaneous volume $\Delta V$ previously calculated. In one embodiment, the accuracy $\delta$ of the instantaneous volume can be calculated according to Equation 9, where the variables used are identical to those presented above:

$$\delta = \frac{P_E \cdot P_F}{P_F - P_E} \cdot \frac{1}{P_T^2} \qquad \text{Equation 9}$$

In an exemplary embodiment, as noted previously, a gas pressure of 3.5 bar or over 3.5 bar is generally used as the reference pressure $P_0$. In this situation, the measured pressures will generally have the relationship of 2.0 bar<$P_E$<$P_F$<$P_0$.

The method of determining the instantaneous volume $\Delta V$, the volume percent V %, or accuracy $\delta$ according to the present disclosure is theoretically based on pressure variations caused by volume variations of a specific amount of gas, which is essentially a detection method of the volume percent or liquid level based on gas diffusion. In the above detection process, the volume/liquid level percent of any amount of liquid filled into the container 14 may be measured. However, it may be understood that the controller 50 may also be employed to automatically control turn-on and turn-off of the first and second valves 38, 42. The controller 50 can further be configured to read the data acquired from the pressure sensor 46 over time and through multiple cycles of filling and emptying the container 14 of liquid, and average the pressure data to acquire an average pressure value, wherein the average pressure value is used as an instantaneous pressure after diffusion of the supply of gas, that is, the instantaneous pressure $P_T$. Any of the pressures $P_0$, $P_E$, $P_F$, $P_T$ and/or the volumes $V_0$, $V_E$, $V_F$, $V_T$ can be stored in the memory 52 of the controller 50, and/or displayed on the HMI device 56 of the controller 50.

Now referring to FIG. 4, a method 100 of determining volumetric parameters of liquid within the container 14 will be described. The method may begin with step 101, in which the operator or controller 50 closes the second valve 42 and opens the first valve 38 that is connected to the second valve 42 by a first tube 22. Closing the second valve 42 in step 101 can also involve exhausting air within the second tube 26 and container 14 through the exhaust 43, such that the air contained within the second tube 26 and container 14 reaches atmospheric pressure. Then, in step 102, the controller 50 can direct the pressurized gas source 34 to fill the first tube 22 with gas through the first valve 38 until the supply of gas within the first tube 22 reaches a reference pressure $P_0$. The reference pressure $P_0$ can be about 3.5 bar, thought it can be more or less than 3.5 bar in other embodiments. In this situation, the supply of gas will occupy the reference volume $V_0$ at the reference pressure $P_0$. In step 106, the controller 50 will close the first valve 38 and open the second valve 42, such that the supply of gas diffuses to the container 14 through a second tube 26 attached to the second valve 42 and the container 14, wherein the container 14 contains none of the liquid. At this time, the supply of gas will occupy the reference volume $V_0$, the full volume $V_F$, and the empty volume $V_E$. Once the supply of gas becomes stable, in step 110 the pressure sensor 46 can measure a first stable pressure (empty pressure $P_E$) of the supply of gas and transmit a signal to the controller 50 through the second signal connection 58b that is indicative of the empty pressure $P_E$.

After the empty pressure $P_E$ has been measured, in step 114 the first and second valves 38, 42 can be opened and the container 14 can be filled with liquid up to the liquid level upper limit marker 16, such that the container contains a full supply of liquid 15a. Once the container 14 has been filled, the controller 50 can direct the second valve 42 to close in step 118. Closing the second valve 42 in step 118 can also involve exhausting air within the second tube 26 and container 14 through the exhaust 43, such that the air contained within the second tube 26 and container 14 reaches atmospheric pressure. Then the controller 50 can direct the pressurized gas source 34 to fill the first tube 22 with gas through the first valve 38 until the supply of gas within the first tube 22 reaches the reference pressure $P_0$ in step 119. Following this, in step 121, the controller 50 will close the first valve 38 and open the second valve 42, such that the supply of gas diffuses to the container 14 through the second tube 26 and the container 14, wherein the container 14 contains the full supply of liquid 15a. Then, in step 122, the pressure sensor 46 can measure a second stable pressure (full pressure $P_F$) of the supply of gas and transmit a signal to the controller 50 through the second signal connection 58b that is indicative of the full pressure $P_F$. When the supply of gas is at the full pressure $P_F$, the supply of gas occupies the reference volume $V_0$ and the full volume $V_F$. After the full pressure $P_F$ has been determined, in step 126 the controller 50 can direct the first and second valves 38, 42 to open, and the container 14 can discharge a portion of the amount of liquid. After a portion of the liquid has been discharged, the container 14 will continue to hold a partial supply of the liquid 15b that is between no liquid and the full supply of liquid 15a, where the partial supply of liquid 15b has the instantaneous volume $\Delta V$.

Next, the controller 50 can direct the second valve 42 to close in step 127. Closing the second valve 42 in step 127 can also involve exhausting air within the second tube 26 and container 14 through the exhaust 43, such that the air contained within the second tube 26 and container 14 reaches atmospheric pressure. Then the controller 50 can direct the pressurized gas source 34 to fill the first tube 22 with gas through the first valve 38 until the supply of gas within the first tube 22 reaches the reference pressure $P_0$ in step 128. Following this, in step 129, the controller 50 will close the first valve 38 and open the second valve 42, such that the supply of gas diffuses to the container 14 through the second tube 26 and the container 14, wherein the container 14 contains the partial supply of liquid 15b. At this time, the gas will occupy the reference volume $V_0$, the full volume $V_F$, and the instantaneous volume $V_T$. The pressure sensor 46 can then detect an instantaneous pressure $P_T$ of the supply of gas and transmit a signal to the controller 50 through the second signal connection 58b that is indicative of the instantaneous pressure $P_T$ in step 130. Once the instantaneous pressure $P_T$ has been communicated to the controller 50, in step 131 the controller 50 can calculate the instantaneous volume $\Delta V$ of the liquid within the container 50. In one embodiment, step 131 involves calculating the instantaneous volume $\Delta V$ according to Equation 7 as described above.

In step 138, steps 126-131 can be repeated so as to detect the instantaneous pressure $P_T$ after another portion of the liquid has been discharged from the container 14. In addition to the instantaneous volume $\Delta V$ calculated in step 131, in step 142 the controller 50 can calculate a volumetric percentage V % of the liquid in the container 14 based on the first stable pressure (empty pressure $P_E$), second stable pressure (full pressure $P_F$), and the instantaneous pressure ($P_T$). In one embodiment, the volumetric percentage V % can be calculated according to Equation 8. Further, in step 146, the container 14 can be emptied, and in step 150 steps 101, 102, 106, 110, 114, 118, 119, 121, 122, 126-131, 142, and 146 can be repeated over multiple dispensing operations. As such, in step 154 the volumetric percentage V % of the liquid in the container 14 can be calculated based on an average of the measured empty pressures $P_E$, full pressures $P_F$, and instantaneous pressures $P_T$ over multiple dispensing operations. In step 158, the controller 50 can calculate the accuracy $\delta$ of the instantaneous volume $\Delta V$ measured by the pressure sensor 46. The controller can do this by utilizing Equation 9, as described above. The controller 50, particularly the HMI device 56, can display the instantaneous volume $\Delta V$ in step 162. In addition to the instantaneous volume $\Delta V$, the HMI device 56 can also display the volumetric percentage V %, the accuracy $\delta$, and/or any of the percentages $P_0$, $P_E$, $P_F$, and $P_T$. The memory 52 of the controller 50 can also be used to automatically or selectively store any of these values.

In one example, real-time liquid level measurement is performed for a 30-ml adhesive container, and a 3.5 bar reference pressure $P_0$ is used, where the reference pressure $P_0$ is maintained for 1.5 seconds in the gas storage section. In this embodiment, the adhesive container 14 has a constant cross section area. Volume percentage detection results are as follows:

TABLE 1

| NO. | Pratical liquid level | Measured liquid level 1 | Measured liquid level 2 | Measured liquid level 3 | Measured liquid level 4 | Measured liquid level 5 | Precision |
|---|---|---|---|---|---|---|---|
| 1 | 100% | 100% | 100% | 100% | 100% | 100% | 0% |
| 2 | 93% | 94% | 94% | 94% | 94% | 94% | −1% |

TABLE 1-continued

| NO. | Pratical liquid level | Measured liquid level 1 | Measured liquid level 2 | Measured liquid level 3 | Measured liquid level 4 | Measured liquid level 5 | Precision |
|---|---|---|---|---|---|---|---|
| 3 | 83% | 83% | 83% | 83% | 83% | 83% | 0% |
| 4 | 72% | 74% | 74% | 74% | 72% | 73% | −2% |
| 5 | 59% | 61% | 61% | 61% | 61% | 61% | −2% |
| 6 | 48% | 49% | 49% | 49% | 49% | 49% | −1% |
| 7 | 37% | 38% | 38% | 38% | 38% | 38% | −1% |
| 8 | 25% | 27% | 27% | 27% | 27% | 27% | −2% |
| 9 | 12% | 15% | 15% | 15% | 15% | 15% | −3% |
| 10 | 0% | 1% | 1% | 1% | 1% | 1% | −1% |

The above table lists practical liquid level percentage values, measured liquid level percentage values, and measured precision values of the 30-ml container. During the measurement, liquid is first filled into the container 14. After filling the container 14, the practical liquid level is 100%. Then, the liquid in the container is constantly dispensed or discharged. Before each discharge, the controller 50 is triggered to detect the instantaneous liquid level. In addition, five consecutive detections are performed to acquire five detected liquid level values. The measurement is continued until the liquid in the container 14 is absolutely dispensed or discharged. In this case, the practical liquid level is 0%. The experimental results show that a difference between the practical and measured liquid level percentage is less than 3%, If the precision of the pressure sensor 46 is taken into account, the measurement precision is about 1.5%. The experimental results indicate that the detection method for the liquid level using the detection system 10 is relatively reliable, and through this method, the measurement results having an extremely high precision and may be acquired at an early stage of dispensing operations.

In a second example, real-time liquid level percentage measurement is performed for a 300-ml adhesive container, and a 3.5 bar reference pressure $P_0$ is used, where the reference pressure $P_0$ is maintained for 1.5 seconds in the gas storage section. In this embodiment the adhesive container 14 has a constant cross section area. Volume percentage detection results are as follows:

are correspondingly measured. The experimental results show that a difference between the practical and measured liquid level percentages is less than 2%.

In addition, as known from the experiments, with respect to a container having a volume greater than 300 ml or even greater than 1 L, liquid level percentage detection using the detection system 10 may still achieve a precision acceptable in this field.

Using the detection system 10, a weight sensor or a flow rate sensor having a high precision is not needed to accommodate micro variations in volumetric parameters. Additionally, the measurement operations described herein may be performed without disassembling the container 14. As some containers 14 can be hard to disassemble, measurement using the detection system 10 is particularly convenient and safe. Also, by reasonably adjusting the volume of various components of the detection system 10 and the pressure of gas supplied to the detection system 10, variations in the container 14 may be effectively accommodated without affecting the measurement precision.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the

TABLE 2

| NO. | Pratical liquid level | Measured liquid level 1 | Measured liquid level 2 | Measured liquid level 3 | Measured liquid level: 4 | Measured liquid level 5 | Precision |
|---|---|---|---|---|---|---|---|
| 1 | 100% | 100% | 100% | 100% | 100% | 100% | 0% |
| 2 | 94% | 94% | 94% | 94% | 94% | 94% | 0% |
| 3 | 88% | 88% | 88% | 88% | 88% | 88% | 0% |
| 4 | 82% | 81% | 81% | 81% | 81% | 81% | 1% |
| 5 | 75% | 75% | 75% | 75% | 75% | 75% | 0% |
| 6 | 70% | 69% | 69% | 69% | 69% | 69% | 1% |
| 7 | 65% | 64% | 64% | 64% | 64% | 63% | 1% |
| 8 | 58% | 57% | 57% | 57% | 57% | 57% | 1% |
| 9 | 52% | 51% | 51% | 51% | 51% | 51% | 1% |
| 10 | 44% | 43% | 43% | 43% | 43% | 43% | 1% |
| 11 | 37% | 36% | 36% | 35% | 35% | 35% | 1% |
| 12 | 29% | 27% | 27% | 27% | 27% | 28% | 2% |
| 13 | 20% | 19% | 19% | 19% | 19% | 19% | 1% |
| 14 | 14% | 12% | 12% | 12% | 12% | 12% | 2% |
| 15 | 8% | 6% | 5% | 7% | 6% | 6% | 2% |
| 16 | 0% | 0% | 0% | 0% | 0% | 0% | 0% |

The above table lists practical liquid level percentage values, measured liquid level percentage values, and measured precision values for the 300-ml container. The measurement steps are approximately the same as those for the 30-ml container. The difference only lies in that additional discharge operations are performed, and more liquid levels present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A method of determining volumetric parameters of liquid within a container, the method comprising:
   a) closing a second valve and opening a first valve connected to the second valve by a first tube;
   b) filling the first tube with gas through the first valve until a supply of gas within the first tube reaches a reference pressure;
   c) closing the first valve and opening the second valve, such that the supply of gas diffuses to the container through a second tube attached to the second valve and the container, wherein the container contains none of the liquid;
   d) measuring a first stable pressure of the supply of gas;
   e) filling the container with an amount of the liquid;
   f) closing the second valve;
   g) filling the first tube with gas through the first valve until the supply of gas within the first tube reaches the reference pressure;
   h) closing the first valve and opening the second valve, such that the supply of gas diffuses to the container through the second tube;
   i) measuring a second stable pressure of the supply of gas;
   j) discharging a portion of the amount of the liquid from the container;
   k) closing the second valve;
   l) filling the first tube with gas through the first valve until the supply of gas within the first tube reaches the reference pressure;
   m) closing the first valve and opening the second valve, such that the supply of gas diffuses to the container through the second tube;
   n) detecting an instantaneous pressure of the supply of gas; and
   o) calculating an instantaneous volume of the liquid within the container.

2. The method of claim 1, wherein step o) includes calculating the instantaneous volume according to the equation:

$$\Delta V = P_0 \cdot V_0 \left( \frac{1}{P_E} - \frac{1}{P_T} \right)$$

where:
$\Delta V$=the instantaneous volume;
$P_0$=the reference pressure
$V_0$=a volume of the supply of gas at the reference pressure
$P_E$=the first stable pressure; and
$P_T$=the instantaneous pressure.

3. The method of claim 1, further comprising:
p) repeating steps j)-o).

4. The method of claim 1, further comprising:
p) calculating a volumetric percentage of the liquid in the container based on the first stable pressure, the second stable pressure, and the instantaneous pressure.

5. The method of claim 4, wherein step p) includes calculating the volumetric percentage according to the equation:

$$V\% = \frac{P_E \cdot P_F}{P_F - P_E} \cdot \left( \frac{1}{P_E} - \frac{1}{P_T} \right)$$

where:
$V\%$=the volumetric percentage;
$P_E$=the first stable pressure;
$P_F$=the second stable pressure; and
$P_T$=the instantaneous pressure.

6. The method of claim 4, further comprising:
q) emptying the container, such that the container contains none of the liquid;
r) repeating steps a)-o) multiple times; and
s) calculating the volumetric percentage of the liquid in the container based on an average of the first stable pressures, an average of the second stable pressures, and an average of the instantaneous pressures.

7. The method of claim 1, further comprising:
p) calculating an accuracy of the instantaneous volume.

8. The method of claim 7, wherein step p) includes calculating the accuracy of the instantaneous volume according to the equation:

$$\delta = \frac{P_E \cdot P_F}{P_F - P_E} \cdot \frac{1}{P_T^2}$$

where:
$\delta$=accuracy of the instantaneous volume (%);
$P_E$=the first stable pressure;
$P_F$=the second stable pressure; and
$P_T$=the instantaneous pressure.

9. The method of claim 1, further comprising:
p) displaying the instantaneous volume on a human-machine interface (HMI) device.

10. A detection system for determining a volumetric parameter of a liquid in a container, the detection system comprising:
a first valve;
a second valve;
a first tube connected to the first valve and the second valve, wherein the first tube is configured to receive a supply of gas at a reference pressure when the first valve is open and the second valve is closed;
a second tube connected to the second valve and the container;
a pressure sensor in fluid communication with the first and second tubes; and
a controller in signal communication with the first and second valves and the pressure sensor, wherein the controller is configured to selectively open and close the first and second valves, and the controller is further configured to:
 a) receive a first signal from the pressure sensor corresponding to a first stable pressure of the supply of gas when the first valve is closed and the second valve is open, such that the supply of gas diffuses through the first and second tubes and the container and the container contains none of the liquid;
 b) receive a second signal from the pressure sensor corresponding to a second stable pressure of the supply of gas when the first valve is closed and the second valve is open, such that the supply of gas diffuses through the first and second tubes and the container and the container contains an amount of the liquid;
 c) receive a third signal from the pressure sensor corresponding to an instantaneous pressure of the supply of gas when the first valve is closed and the second valve is open, such that the supply of gas diffuses through the first and second tubes and the container and the container contains a portion of the amount of the liquid; and
 d) calculate an instantaneous volume of the portion of the amount of the liquid.

11. The detection system of claim 10, wherein the controller is configured to calculate the instantaneous volume according to the equation:

$$\Delta V = P_0 \cdot V_0 \left( \frac{1}{P_E} - \frac{1}{P_T} \right)$$

where:
$\Delta V$=the instantaneous volume;
$P_0$=the reference pressure
$V_0$=a volume of the supply of gas at the reference pressure $P_E$=the first stable pressure; and
$P_T$=the instantaneous pressure.

12. The detection system of claim 10, wherein the controller is further configured to:
e) calculate a volumetric percentage of the liquid in the container based on the first stable pressure, the second stable pressure, and the instantaneous pressure.

13. The detection system of claim 12, wherein the controller is configured to calculate the volumetric percentage according to the equation:

$$V\% = \frac{P_E \cdot P_F}{P_F - P_E} \cdot \left( \frac{1}{P_E} - \frac{1}{P_T} \right)$$

where:
V %=the volumetric percentage;
$P_E$=the first stable pressure;
$P_F$=the second stable pressure; and
$P_T$=the instantaneous pressure.

14. The detection system of claim 10, wherein the controller is further configured to:
e) calculate an accuracy of the instantaneous volume.

15. The detection system of claim 14, wherein the controller is configured to calculate the accuracy of the instantaneous volume according to the equation:

$$\delta = \frac{P_E \cdot P_F}{P_F - P_E} \cdot \frac{1}{P_T^2}$$

where:
$\delta$=accuracy of the instantaneous volume (%);
$P_E$=the first stable pressure;
$P_F$=the second stable pressure; and
$P_T$=the instantaneous pressure.

16. The detection system of claim 10, further comprising:
an adapter that connects the second tube to the container.

17. The detection system of claim 16, further comprising:
a reinforcement member configured to create a fluidic seal between the adapter and the second tube.

18. The detection system of claim 10, further comprising:
a pressurized air source configured to provide the supply of gas to the first tube; and
a third tube connected to the pressurized air source and the first valve.

19. The detection system of claim 10, wherein the controller includes a memory configured to store the first stable pressure, the second stable pressure, and the instantaneous pressure.

20. The detection system of claim 10, wherein the controller includes a display configured to display the instantaneous volume.

* * * * *